April 13, 1943.          W. H. D. BROUSE          2,316,399
MEANS FOR ADJUSTING THE LENGTH OF STROKE OF PISTONS
Filed Nov. 26, 1941          3 Sheets-Sheet 1

Inventor.
W. H. D. Brouse
by
H. J. S. Dennison
Atty

April 13, 1943.  W. H. D. BROUSE  2,316,399
MEANS FOR ADJUSTING THE LENGTH OF STROKE OF PISTONS
Filed Nov. 26, 1941  3 Sheets-Sheet 2
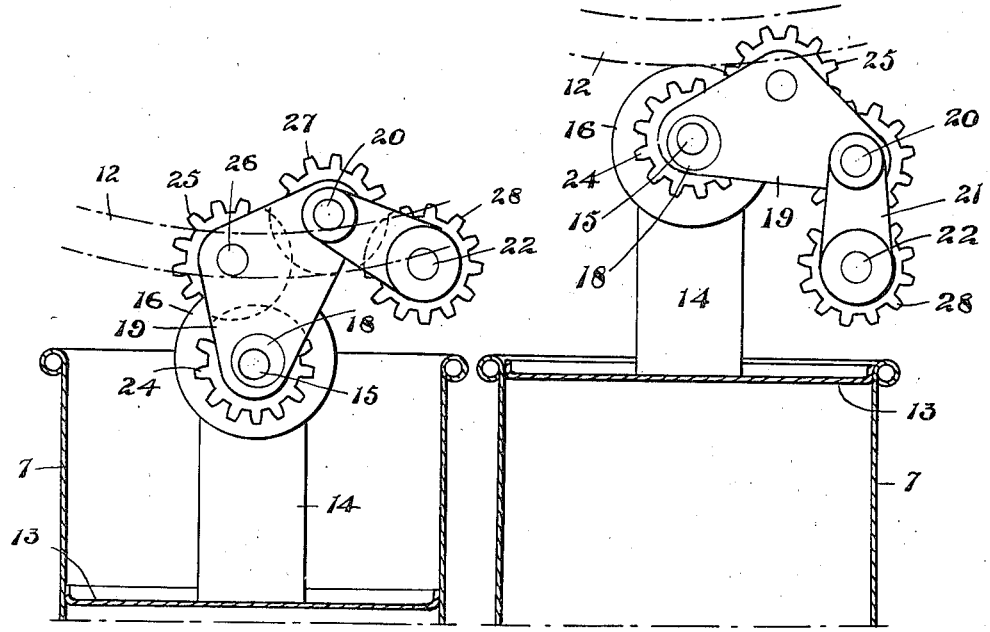
Fig.3.  Fig.4.
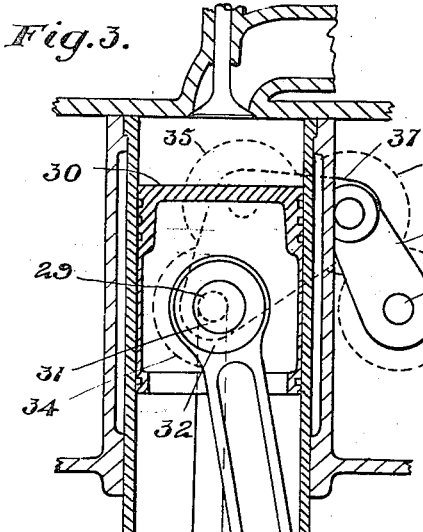
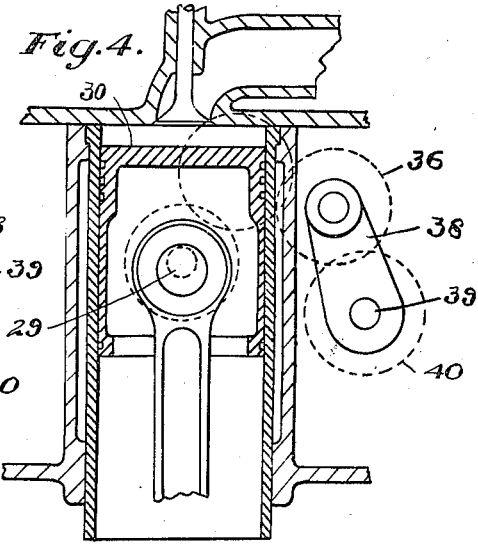
Fig.7.  Fig.8.
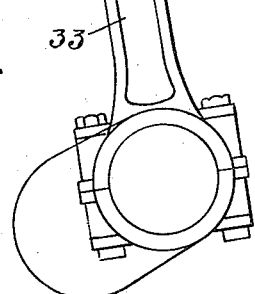
Inventor.
W. H. D. Brouse
by
H. J. S. Dennison
atty.

Inventor.
W. H. D. Brouse

Patented Apr. 13, 1943

2,316,399

UNITED STATES PATENT OFFICE 2,316,399

MEANS FOR ADJUSTING THE LENGTH OF STROKE OF PISTONS

William H. D. Brouse, Toronto, Ontario, Canada, assignor to John Wood Manufacturing Company, Inc., Philadelphia, Pa.

Application November 26, 1941, Serial No. 420,574

6 Claims. (Cl. 74—600)

In fluid meters, pumps, engines and other mechanisms utilizing pistons operating in the cylinders it is found desirable under certain conditions to adjust the length of a piston stroke. Particularly in fluid meters of the piston type it is found desirable to obtain accuracy of measurement and that the piston stroke be altered under certain conditions of operation and the object of the present invention is to provide a simple form of mechanical movement which may be operated from outside of the machine and will enable the ready changing of the stroke of the piston.

The principal feature of the invention consists in the novel manner of altering the relative positions of the pistons and their stroke-controlling members through the medium of a plurality of intermeshing gears mounted to oscillate in harmony with the movement of the pistons and to control the length of travel of the pistons through the rotation of an eccentric sleeve mounted on the piston pin, the outer of said plurality of gears being held in adjusted positions.

In the accompanying drawings

Figure 3 is an enlarged diagrammatic vertical mid-section and elevation through one of the pistons taken on the line 3—3 of Figure 1 showing the piston at the bottom of its stroke in the lowermost adjusted position.

Figure 4 is a diagrammatic section and elevational view similar to Figure 3 showing the piston at the top of its stroke with the maximum upward movement.

Figure 7 is a longitudinal mid-sectional view showing an engine cylinder with its piston in mid-stroke and showing the application of the present invention thereto for altering the stroke.

Figure 8 is a view similar to Figure 7 showing a different adjustment of the stroke regulation from that shown in Figure 7.

Figure 2:
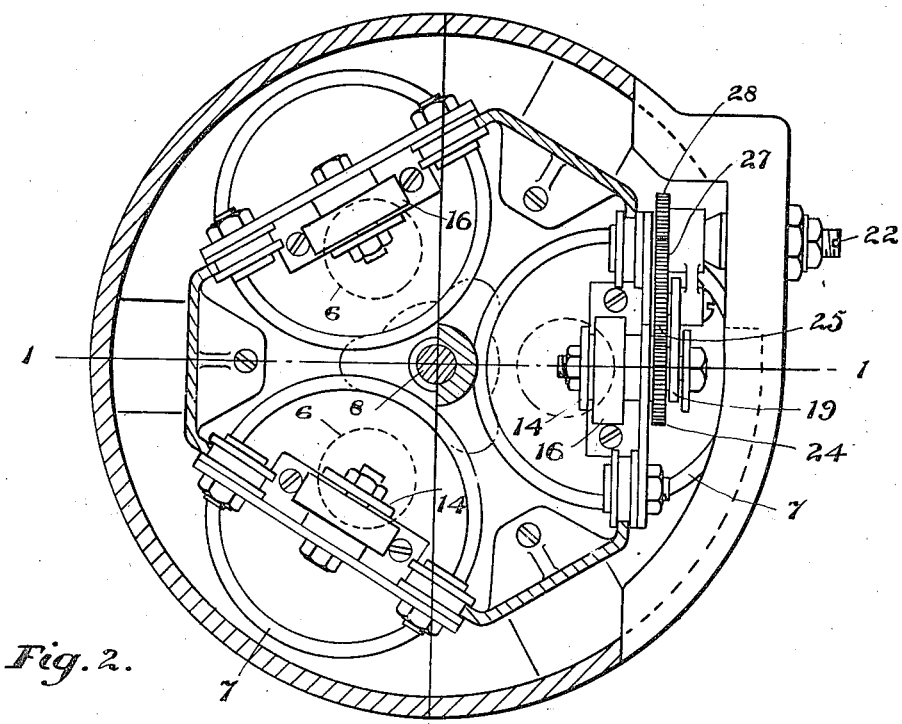
Figure 2 is a horizontal plan section of the meter taken on the line 2—2 of Figure 1.
Figure 1:
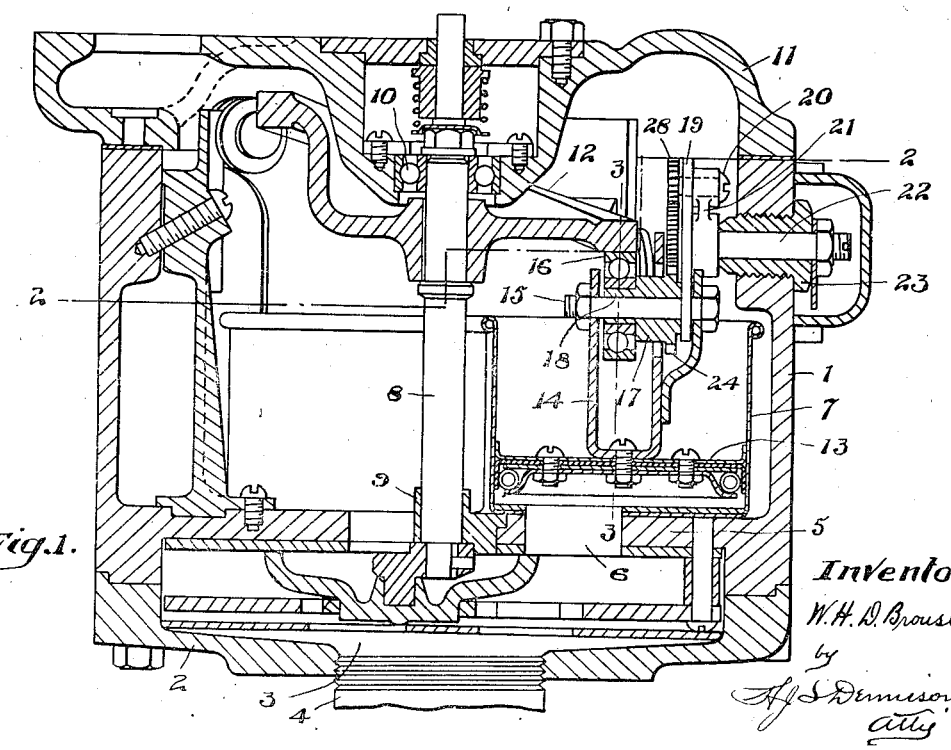
Figure 1 is a vertical mid-sectional view taken through a fluid meter, the section being taken on the line 1—1 of Figure 2.

The type of fluid meter illustrated in Figures 1 and 2 is the type shown and described in detail in my copending application No. 382,891, filed March 12, 1941, for Fluid meters. In this structure the cylindrical meter casing 1 is closed by a bottom plate 2 which is provided with a central orifice 3 in which an inflow pipe 4 is secured. A flange 5 extends inwardly from the inner wall of casing 1 and is spaced above the bottom plate 2. The flange 5 is formed with a plurality of ports 6 which lead through the bottom of the cylinders 7 which are suitably secured to the said flange. A spindle 8 is journalled at the bottom end in a bushing 9 supported in a central opening in the flange 5 and a suitable valving mechanism is arranged between the flange 5 and the bottom plate 2 and is operatively connected with a spindle 8 to control the inflow and outflow of fluid through the ports 6 to the different cylinders.

The upper end of the spindle 8 is journalled in a bearing 10 mounted in the cover 11 which closes the top of the casing 1. A spiral cam plate 12 is mounted on the spindle 8 below the cover plate and extends over the several cylinders 7.

In the particular form of the device herein shown there are preferably three cylinders arranged equi-distant from each other and spaced around the centre of the spindle axis. The cylinders 7 are open at the top and pistons 13 operate therein. Each of the pistons is provided with a centrally arranged bracket member 14 which is here shown of U-shape. In each of the brackets and adjacent to the open upper end thereof is mounted a radially disposed horizontal bolt 15 and on a bushing on each bolt is suitably mounted a roller-bearing supported roller 16. The perimeter of each of these rollers engages the underside of the spiral track of the cam 12. The spiral of the cam track is of such a nature that the upward thrust of the pistons through the inflow of fluid through the ports 6 causes the cam to rotate, thereby rotating the spindle 8 to operate the valve to control the inflow to the cylinders progressively and the spindle is of course attached to a suitable indicating or recording device, which is not shown.

In a device of the character herein shown and described it is necessary that the movement of at least one of the pistons be calibrated so that the instrument may be accurately adjusted to measure the proper quantity of fluid flowing into and out of the several cylinders.

In the structure herein shown, particularly Figures 1 and 2, the horizontally arranged bolt 15 of one of the pistons 13 has rotatably mounted thereon a bushing 17 which is formed with an eccentrically arranged journal portion 18, upon which the ball-bearing roller 16 is mounted.

It will be understood that by rotating the bushing upon its supporting bolt the eccentric portion 18 will provide different relationships between the cam 12 and the piston, that is to say, when the enlarged portion of the eccentric is placed on the upper side of the bolt 15, with the ball-bearing roller 16 intervening, the piston will move to a point lower in the cylinder than when the eccentric is turned with its enlarged portion upward. The stroke of the piston can be altered through rotation of the eccentric until the minimum side of the eccentric (see Figure 5) is upward with the piston at the bottom of its stroke when of course the piston will then have its minimum upward stroke.

In order to rotate the bushing 17 with its eccentric extension, a very simple form of mechanism is provided. A plate 19, which is of substantially triangular form, is pivotally mounted at one of its angles upon the bolt 15. A pivot pin 20 is mounted at the remote angle of the plate 19 from the portion pivoted on the bolt 15 and this pin is pivotally connected with a link arm 21, which is pivotally supported on a spindle 22 which is rotatably mounted in a suitable journal bushing 23 in the meter casing 1.

A spur gear 24 forms part of or is mounted upon the bushing 17 carried on the bolt 15 which has the eccentric extension, and a spur gear 25 is rotatably mounted on a pin 26 secured on the triangular plate 19 intermediately between the bolt 15 and the pivot pin 20. The gear 25 meshes with the gear 24.

A similar gear 27 is mounted on the pin 20 and meshes with the gear 25 and a fourth and similar spur gear 28 is mounted on the spindle 22 supported in the meter casing and meshes with the gear 27.

The triangular plate 19, being pivotally supported at one end on the piston bolt 15 and at the other end on the free end of the pivotal link 21 rises and falls with the movement of the piston. The gears 27 and 25 are constantly in mesh with the gears 28 and 24 respectively and 25 and 27 are in mesh with each other. These two intermediate gears form an idler connection between the gears 28 and 24, and, as the gear 28 normally remains fixed on its spindle, the upward and downward movement of the piston and the rising and falling motion of the plate 19 causes the gears 27, 25 and 24 to rotate thus rotating the sleeve 17 carrying the eccentric 18.

It will be seen on reference to Figure 3 that when the piston 13 is in the lowermost position the large side of the eccentric 18 is above the horizontal diameter of the piston bolt 15 with the roller 16 in contact with the cam 12.

When the inflow of fluid to the cylinder causes the piston to rise it lifts the cam plate which swings on its pivot on the link arm 21 and assumes a position substantially as illustrated in Figure 4 and the intermeshing gears rotate a portion of a revolution so that the larger portion of the eccentric 18 is reversed to a position below the horizontal diameter of the bolt 15.

Figures 5, 6:
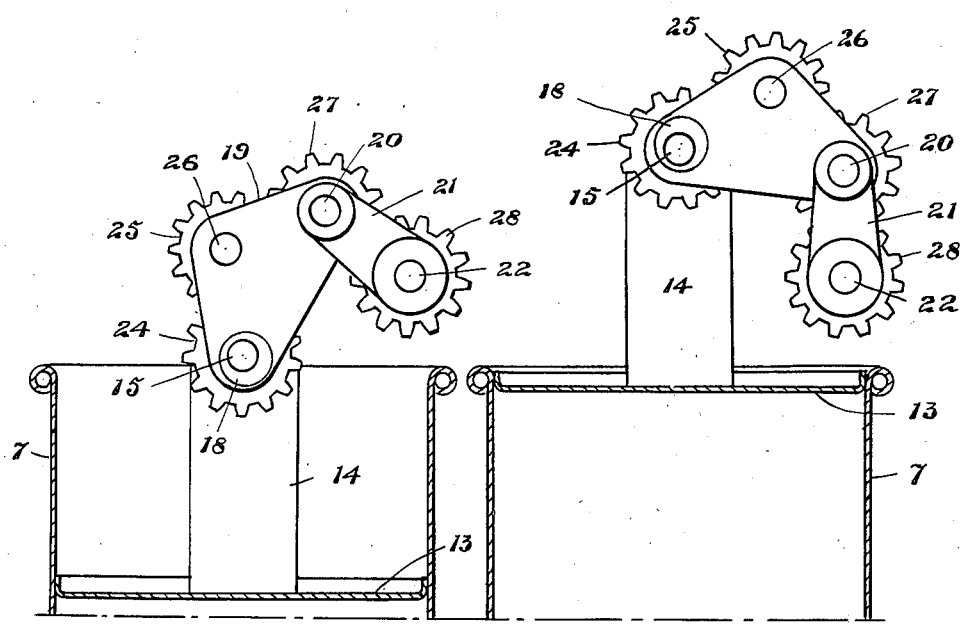
Figure 5 is a view similar to Figure 3 showing the piston at the bottom of its stroke with the minimum stroke adjustment.
Figure 6 is a view similar to Figure 4 showing the piston at the top of its stroke with the minimum upward adjustment.

In order to change the stroke of the piston it is merely necessary to turn the spindle 22, which extends through the meter casing and upon such spindle being turned the gear 28 is rotated and through it the gears 27 and 25 rotate the gear 24 to turn the bushing so as to swing the eccentric portion 18 into a different relative position. In Figure 5 the larger side of the eccentric is shown to be below the horizontal diameter of the bolt 15 of the piston or rotated nearly a half revolution from the position illustrated in Figure 3. Consequently the piston travel is less than the distance travelled when the eccentric bushing is in the relation shown in Figure 3.

In Figure 6 the relative position of the parts is shown with the large portion of the eccentric 18 above the horizontal diameter of the piston bolt 15 at the upper end of the piston stroke.

The maximum and minimum positions of adjustment of the pistons are illustrated but it will be readily understood that by manipulation of the spindle 22 the position of the eccentric 18 may be altered to any desired degree within the range of approximately 135° and an accurate and minute adjustment may be made in order to properly calibrate the discharge of the meter. It will be understood of course that the diameters of the intermeshing gears carried by the spindle 22 and the member 19 may be altered to alter the ratio of movement of the eccentric sleeve 17.

Figure 9:
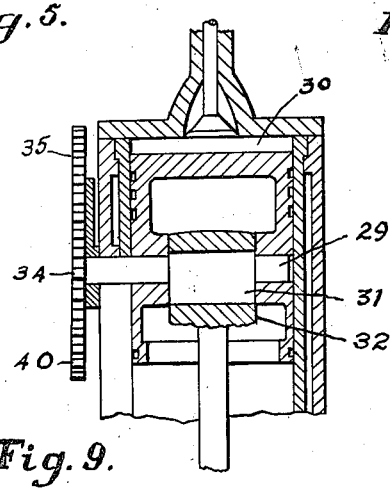
Figure 9 is a sectional view showing the crank pin extending through the cylinder wall and connected to the adjusting mechanism.

The adjustment mechanism herein shown has been illustrated as applied to a piston of a fluid measurment device but it must be understood that the mechanism has other applications and an illustration of a further application is shown in Figures 7, 8 and 9 showing the adjustment applied to the wrist pin of an engine piston. In this application the wrist pin 29 of the engine piston 30 is provided with an eccentric 31 and this eccentric is journalled in the upper bearing 32 of the connecting rod 33.

A toothed gear 34, indicated by dotted lines in Figures 7 and 8, is secured on the outer end of the wrist pin which extends through a suitable slot in the cylinder wall, and meshing with the gear 34 are the idler gears 35 and 36 carried on the floating plate 37, one end of which is pivoted on the wrist pin and the other end is pivoted on the pivotal link 38. The link 38 is pivotally mounted on a spindle 39 to which a gear 40 is secured which meshes with the gear 36. The spindle 39 extends from the interior of the structure to a position available from outside so that adjustments can be made from the exterior of the engine.

It will be noted that with this peculiar form of means for adjusting the stroke of the piston, adjustments can be made while the mechanism is in operation.

The use of such a device on the piston of an internal combustion engine will be appreciated as providing a ready means for adjustment to accommodate the engine to operation under variable conditions of atmospheric density, and as very fine adjustments can be made by the rotation of the gear 40 the operation of an engine can be regulated to the highest efficiency under vastly differing conditions of atmosphere.

In the application of the invention to a meter structure such as shown it will be understood of course that the cam which operates the indicator definitely limits the movement of the measuring piston but by the application of the present invention thereto the length of stroke of one or more of the pistons may be varied so as to regulate the amount of fluid flowing into the cylinders for a given indication movement of the indicator device connected with the rotary cam. Consequently the measurement of the flow of fluid through the meter may be made very accurate.

What I claim as my invention is:

1. A mechanical movement for adjusting the length of stroke of a piston comprising in combination with the piston and piston pin, of means eccentrically mounted on the piston pin for limiting the travel of the piston, oscillatable means operatively connected with the piston, and means connected with said oscillatable means for rotating said eccentric means.

2. A mechanical movement for adjusting the length of stroke of a piston comprising in combination with the piston and piston pin, of an eccentric mounted on the piston pin, an oscillating member connected with the piston a plurality of intermeshing gears operatively connected with said eccentric and mounted on said oscillating member to oscillate in harmony with the movement of said piston, means for effecting the rotation of said gears to rotate said eccentric, and means for effecting the alteration of the relation of said gears to change the relation of the eccentric to the piston and thereby alter its stroke.

3. A mechanical movement for adjusting the length of stroke of a piston comprising in combination with the piston and piston pin, of an eccentric mounted on the piston pin, a gear wheel mounted on said eccentric concentric with the piston pin, a jointed member pivotally mounted at one end concentric with said piston pin and the other end on a fixed pivot, a plurality of gear wheels carried by said jointed member one of which is in mesh with the eccentric gear, and a gear mounted on the fixed pivot of said jointed member and adapted to be held in fixed positions.

4. A mechanical movement for adjusting the length of stroke of a piston comprising in combination with the piston and piston pin, of an eccentric mounted on the piston pin, a gear wheel mounted on said eccentric concentric with the piston pin, a plate pivotally mounted at one end on said piston pin, a pair of intermeshing gears mounted on said plate one of same intermeshing with said eccentric gear, a link arm pivotally connected to said plate on the axis of one of the gears mounted thereon, a spindle mounted in a fixed bearing and pivotally supporting the other end of said link arm, a gear secured on said spindle and meshing with the aforesaid gears and adapted on rotation to change the relative position of said eccentric to said piston and effect a change in the piston stroke.

5. In a fluid meter of the type wherein a plurality of cylinders are grouped around a spindle carrying a cam wheel and the pistons are provided with roller contacts engaging said cam to cause the cam to turn on the inflow of fluid to the cylinders, one of the pistons having an eccentric interposed between the roller and the piston pin and said eccentric having a gear thereon, a plate pivoted at one end on said piston pin, a pair of intermeshing idler gears mounted on said plate one of which intermeshes with said eccentric gear, a link pivoted to the free end of said plate and pivotally mounted on a spindle rotatably mounted in the meter casing, a gear mounted on said spindle meshing with the outermost idler gear carried by said plate, means for rotating said spindle to rotate said gears, and means for locking said spindle.

6. A mechanical movement for adjusting the length of stroke of a piston comprising the combination with the piston and piston pin, of means oscillatably mounted on the piston pin for effecting a change in the piston stroke, and articulated means floating with the piston and anchored at one end adapted to effect the oscillation of the stroke controlling member on said piston pin.

WILLIAM H. D. BROUSE.